July 23, 1968  W. D. RICHARDSON ET AL  3,393,703
DEVICE FOR SEALING AND CONNECTING THE ENDS OF TUBES
Filed Jan. 3, 1966
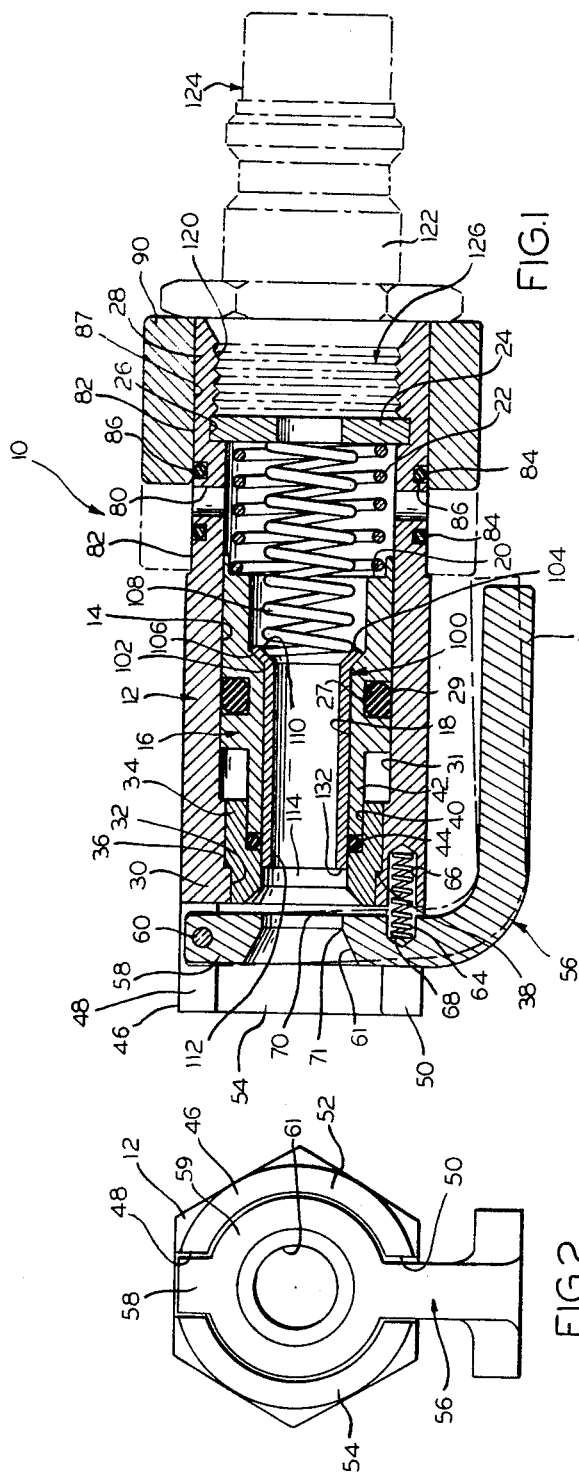
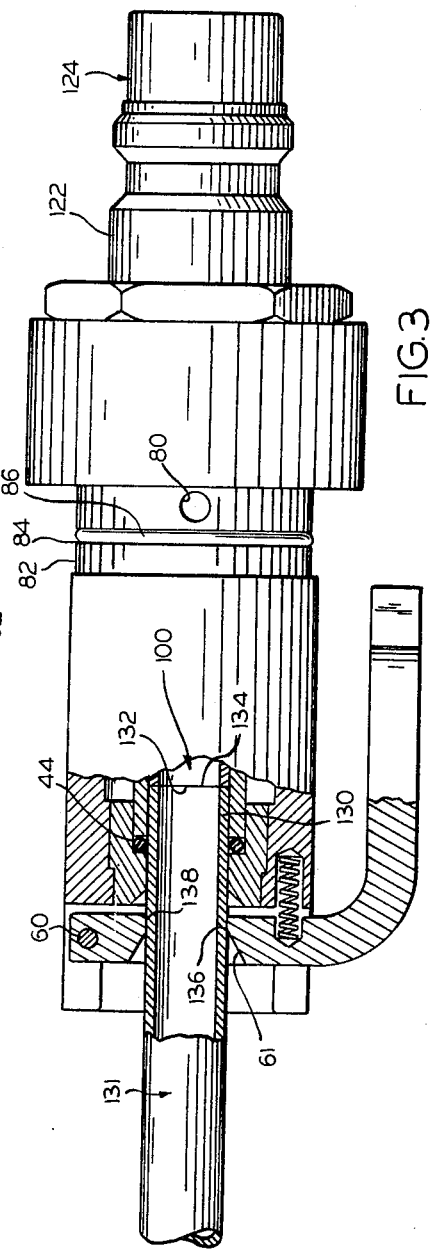
INVENTORS
WILLIAM D. RICHARDSON
WALTER J. BANGS
ERNEST H. SCHANZLIN
BY
ATTORNEYS United States Patent Office 3,393,703
Patented July 23, 1968

1

3,393,703
DEVICE FOR SEALING AND CONNECTING
THE ENDS OF TUBES
William D. Richardson, Palos Heights, Walter J. Bangs, Chicago, and Ernest H. Schanzlin, Olympia Fields, Ill., assignors to Tuthill Pump Company, a corporation of Illinois
Filed Jan. 3, 1966, Ser. No. 518,084
6 Claims. (Cl. 137—583)

ABSTRACT OF THE DISCLOSURE

The invention is concerned with a self locking tube connector for joining, for instance, a testing apparatus and a terminal tube of an apparatus to be tested, involving a hollow body having one end open to receive the tube end to be sealed, and containing a spring biased plunger that at one end thereof engages an annular seal within which the tube end is disposed for sealing purposes, with the plunger including a slidably mounted spring biased internal sleeve member proportioned to have the same external diameter as the tube end to be sealed and extend within the seal when the connector is not in use to keep the seal radially expanded for ready reception of the tube end when the latter is inserted by pushing the internal sleeve member ahead of it and against its biasing spring. The plunger is equipped with a seal applied thereabout between its ends that acts between it and the connector body, and the arrangement is such that when the tube end is inserted within the connector and fluid under pressure is received therein, the pressure involved acts on the other end of the plunger to compress the tube end receiving seal at its said one end that then is further compressed against the tube end to increase the sealing action involved.

The connector body is formed with one or more venting ports that communicate with the interior of the body, and a sliding sleeve that cooperates with seals to seal off the ports in one position thereof and vent the ports to the atmosphere in another position thereof, so that the connector can be vented to the atmosphere before disconnecting same from the tube end.

Our invention relates to a device for sealing and connecting the ends of tubes, and more particularly, our device relates to improvements in the tube sealer and connector device disclosed in Patent 2,819,733, granted to Oliver Maisch on Jan. 14, 1958.

The Maisch patent discloses a tube sealer and connector device for providing a quick leak-proof detachable self-locking connection for joining, for instance, a testing apparatus and a terminal tube of an apparatus to be tested, although such device may also be used merely to seal off the tube end. The Maisch device comprises a hollow body member having one end open to receive the tube end that is to be sealed and containing a spring biased plunger provided with a seal at one end thereof that is engaged by the tube end that is being inserted against the spring action of the plunger. The Maisch connector further includes a releasable locking device that permits the tube end to move freely into the body member but which opposes withdrawal until released.

The Maisch device then permits pressure or vacuum tests on the apparatus of which the tube end forms a part, although it can also serve as merely a tube end sealer, as disclosed in the Maisch patent, by appropriately closing off the open end of the Maisch body member.

A principal object of this invention is to provide a valving arrangement for venting devices of this type to the atmosphere prior to disconnecting them from the tube end.

2

Another principal object of the invention is to provide a modified plunger arrangement for devices of this type including an auxiliary spring loaded sleeve that functions to keep the seal that engages the tube end expanded until the tube end is inserted.

Another object of the invention is to provide a device for sealing and connecting the ends of tubes that is economical of manufacture, convenient in use, and readily adapted to a wide variety of applications.

Other objects, uses, and advantages will be obvious or will become apparent from a consideration of the following detailed description and the application drawings.

In the drawings:
FIGURE 1 is a longitudinal sectional view through the device along its longitudinal axis, showing the locking lever positioned to receive the tube end;
FIGURE 2 is an end view of the device of FIGURE 1 taken from the left hand end thereof; and
FIGURE 3 is a side elevational view of the device shown in FIGURE 1, partially in section, and illustrating a tube end applied thereto.

However, it should be distinctly understood that the specific drawing illustrations provided are supplied primarily to comply with the requirements of the Patent Code, and that the invention may have other embodiments as will be obvious to those skilled in the art.

Reference numeral 10 of FIGURES 1, 2 and 3 generally indicates a specific embodiment of our invention which comprises a hollow body member 12 that in the form shown has a hexagonal external configuration (see FIGURE 2), and which defines a bore or chamber 14 in which is shiftably mounted a plunger member 16 that is formed with a bore 18.

The plunger 16 is further formed with a spring seat at 20 that is engaged by one end of compression spring 22 which has its other end seated against annular disc 24 mounted in recess 26 at end 28 of the body member 12. Additionally plunger 16 is formed with an annular recess 27 in which is seated an O-ring seal 29 which is in sealing relation between the walls of recess 27 and the cylindrical wall 31 that defines bore 14.

The body member 12 at its other end 30 is formed with opening 32 that broadly speaking is intended to receive the end of the tube that is to be connected or sealed, and in the specific embodiment illustrated, the body member 12 has seated in opening 32 a tubular insert member 34 provided with a shoulder 36 that seats against the shoulder 38 of the body member, The insert 34 is counterbored as at 40 to receive a reduced end portion of a plunger member 42 as well as O-ring seal 44 that is in circumambient relation about the bore 18 of plunger 16 and is intended to sealingly engage the tube end when same is inserted in device 10.

The body member 12 at its end 30 is formed with a cylindrical portion 46 that is formed with a pair of oppositely disposed slots 48 and 50 thus defining the cylindrical portion into projecting arms 52 and 54

An L-shaped locking lever 56 has one of its ends or arms 58 pivotally connected within the slot 48 as by pin 60; the end 58 includes generally portion 59 (see FIGURE 2) that is ring-shaped in configuration and defines opening 61 through which the tube end to be inserted in device 10 is applied. The arms 58 of lever 56 extends through the slot 50 and merges into the end or arms 62 thereof which projects more or less longitudinally of the body member 12 and compression spring 64 seated in recesses 66 and 68 of the body member 12 and lever 56 respectively biases the lever 56 to the solid line position shown in FIGURE 1 when the device 10 is not applied to a tube end.

As disclosed in the Maisch patent, the opening 61 of lever 56 is formed to define abrupt edges 70 and 71 that tend to bite into tube end that is inserted in the device 10 for purposes of preventing retreat of same from the body member 12, although release of this locking action is obtained by biasing the portion 62 of lever 56 towards the body member 12 against the action of compression spring 64.

Following the teachings of this invention, the body member 12 is formed with a plurality of ports 80 that communicate between the bore 14 of the body member 12 and the fluid receiving chamber defined by the exterior thereof, the external surface of the body member 12 at end 28 being given a cylindrical configuration on either side of the ports 80, as indicated at 82.

The surface 82 on either side of the ports 80 is formed with a pair of annular recesses 84 that each receive an O-ring seal 86 that is proportioned to sealingly engage the inner surfaces 87 of an annular valve ring or sleeve member 90 which is received over cylindrically formed end 28 of body member 12.

When the annular valve ring or sleeve member 90 is in the dashed line position of FIGURE 1, the openings 80 (which may be of any suitable number but two diagrammatically opposite ports 80 are illustrated in the illustrated arrangement) are closed, blocked, sealed, etc., but by sliding the ring or sleeve 90 to the full line position of FIGURE 1, the ports 80 are exposed to the atmosphere to permit the release of pressure or vacuum conditions within the device 10 to the atmosphere.

Slidably mounted within the plunger member 16 is an internal sleeve member 100 which has one end 102 thereof outwardly flared as at 104 for engagement with an annular seat 106, formed within the bore of the plunger member, under the action of a compression spring 108 that is interposed between the annular spring seat 110 that is defined by the flared portion 104 of sleeve 100, and disc 24.

As indicated in FIGURE 1, the internal sleeve 100 is proportioned so that when its flared portion 104 is seated against the seat 106 of the plunger member 16, its other end 112 projects outwardly of the plunger member 16 and within the O-ring seal 44 in sealing relation therewith.

The sleeve 100 has its external diameter configuration in complementary relation to the internal diameter or configuration of plunger bore 18, and it is contemplated that the internal diameter configuration of bore 18 of plunger member 16 and opening 114 of insert 34 will be of a dimension substantially complementing the external dimension or diameter of the tube end that is to be sealed off or connected to a piece of testing apparatus or the like.

As indicated in FIGURES 1 and 3, the end 28 of body member may be threaded as at 120 for receiving a suitable fitting 122 that may be appropriately connected in any suitable manner to conduiting 124 leading to test apparatus or the like.

Alternately, the opening 126 of the body member end 28 may be closed by a suitable plug (as suggested in FIGURE 3 of said Maisch patent) so that the body member 12 and the device 10 of which it forms a part serves to seal off the end of the tube that is to be inserted in the body member.

To apply the device 10 to a tube end, such as the tube end 130 of the tube indicated at 131 in FIGURE 3, the device 10 is slipped over the end of the tube 131 to insert the tube end 130 through opening 61 of the lever 56 and opening 114 of insert 34 until it engages the terminal end portion 132 of the internal sleeve 100, whereupon continued insertion of the tube end 130 into the device 10 is against the biasing action of spring 108, the sleeve member 100 then moving longitudinally of the plunger member 16 and to the right of FIGURE 1 to the point that the terminal end portion 134 of tube end 130 moves past and into sealing engagement with the O-ring seal 44.

The tube end 130 is inserted into the device 10 until substantial resistance is encountered by the spring 108, whereupon the parts of the device will be arranged substantially as indicated in FIGURE 3, with the sleeve 100 displaced to the right of FIGURE 1 with respect to the plunger member 16 and the O-ring seal 44 in sealing engagement with the outer surface of tube end 130. The sealing action provided by seal 29 unbalances the plunger 16 so that it is positively forced against seal 44 with increasing pressure. Locking lever 56 under the action of compression spring 64 and friction between the locking lever and tube end 130 causes the locking lever to bindingly engage the outer surface of the tube end 130 at points 136 and 138, thereby preventing withdrawal or ejection of the tube 130 until the lever 56 is swung counterclockwise about pin 60 to move lever end portion 62 toward body 12 a sufficient amount to release the tube end 130.

When the device 10 is arranged as shown in the drawings, and applied to the tube end 130 substantially in the manner indicated, the apparatus of which the tube end 130 forms a part may be tested under vacuum or pressure conditions, depending upon the application, and after testing has been completed, and it is desired to remove the device 10, the sleeve or ring 90 is moved from the broken line position of FIGURE 1 to the full line position to expose ports 80 to the ambient atmosphere and thereby connect the space within the body member 12 to the atmosphere, after which the lever 56 is moved by appropriate finger action to swing its end portion 62 toward the body member 12 the amount required to release the tube end portion 130 for ready withdrawal of device 10 from the tube end.

Where the device 10 is tested under pressure conditions, the pressure acting on the right hand end of the plunger member 16 as shown in FIGURE 1 presses the plunger member 16 against the O-ring seal 44 on the tube end 130 roughly in proportion to the pressures experienced within the bore of body member 12.

On withdrawal of the tube end 130 from the device 10, the compression spring 108 moves the internal sleeve 100 to follow the tube end outwardly of the device 10 to the point where the terminal end portion 132 of the sleeve 100 moves under the O-ring seal 44 and thence to the position indicated in FIGURE 1, thereby maintaining the O-ring seal in its extended or expanded condition.

This automatically readies the device 10 to receive the next tube end to which it is to be applied. The specific arrangement that is illustrated in connection with the sleeve 100 not only eases installation and removal of the tube end 130, but also reduces wear on the seal with consequent improved seal life.

The pressure release feature provided by the ports 80 and the relief valve sleeve or valve 90 permits pressures within the device 10 to be eliminated prior to releasing the holding action of the lock lever 56, which avoids the possibility that the device 10 will shoot off the pipe end when the lever is released after a test under pressure conditions.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:

1. In a tube connector device including a tubular plunger reciprocably mounted in a hollow body member and spring biased for movement toward one end of said body member, with said one end of said body member being formed with an opening for receiving the end of a tube to be sealed, a seal member mounted in said body member between said body member one end and the end of said plunger that is adjacent said body member one end, said seal member being positioned and formed to sealingly engage the tube end when the tube end is inserted through said body member one end and into said body member, said body member defining a fluid receiving chamber adjacent the other end thereof to which the other end of said plunger is exposed, with said seal member, and said plunger being formed to permit fluid flow between said body member chamber and the tube end when the tube end engages said seal member, whereby said plunger is urged against said seal member, when fluid under pressure is received in said chamber, to increase the sealing action of the seal member with respect to the tube end, and including means for releasably locking the tube end in said body member when the tube end is inserted into said body member in sealing relation with said seal member, the improvement wherein:

said body member is formed in its side wall with at least one port opening at the exterior of said body member side wall and having communication with said chamber of said body member, wherein annular seal means are mounted about the exterior of said body member on either side of said port longitudinally of said body member, and including a sleeve member received over said body member and mounted for movement longitudinally of said body member, with said sleeve member being proportioned to extend between and be in sealing engagement with both of said seal means when disposed over said port, whereby said sleeve member may be moved longitudinally of said body member to selectively expose said port to the ambient atmosphere by disengagement from one of said seal means and to seal said port by making said sealing engagement with both of said seal means, whereby the body member chamber may be vented prior to releasing the tube end from said body member.

2. In a tube connector device including a tubular plunger reciprocably mounted in a hollow body member and spring biased for movement toward one end of said body member, with said one end of said body member being formed with an opening for receiving the end of a tube to be sealed, a seal member mounted in said body member between said body member one end and the end of said plunger that is adjacent said body member one end, said seal member being positioned and formed to sealingly engage the tube end when the tube end is inserted through said body member one end and into said body member, said body member defining a fluid receiving chamber adjacent the other end thereof to which the other end of said plunger is exposed, with said seal member, and said plunger being formed to permit fluid flow between said body member chamber and the tube end when the tube end engages said seal member, whereby said plunger is urged against said seal member, when fluid under pressure is received in said chamber, to increase the sealing action of the seal member with respect to the tube end, and including means for releasably locking the tube end in said body member when the tube end is inserted into said body member in sealing relation with said seal member, the improvement wherein:

an internal sleeve member is mounted within said plunger member for sliding movement relative thereto and is spring biased toward said body member one end, and said seal member is in circumambient relation about the bore of said plunger and is proportioned to sealingly engage the external surface of the tube end when the latter is inserted into said body member through said one end thereof, and including:

abutment means cooperating between said internal sleeve member and said plunger member for limiting movement of said internal sleeve member with respect to said plunger member in the direction of said body member one end, said internal sleeve member being proportioned at its end adjacent said body member one end to extend within said seal member in sealing engagement therewith when said abutment means cooperate, whereby as the tube end is inserted into said body member through said one end thereof it sealingly engages said seal member and pushes said internal sleeve member longitudinally of said body member ahead of it and from within said seal member, and on removal of the tube end from said body member, said end of said internal sleeve member returns to said sealing engagement with said seal member, whereby when said device is not being used, said internal sleeve member maintains said seal member expanded for reception over the tube end.

3. In a tube connector device including a tubular plunger reciprocably mounted in a hollow body member and spring biased for movement toward one end of said body member, with said one end of said body member being formed with an opening for receiving the end of a tube to be sealed, a seal member mounted in said body member between said body member one end and the end of said plunger that is adjacent said body member one end, said seal member being positioned and formed to sealingly engage the tube end when the tube end is inserted through said body member one end and into said body member, said body member defining a fluid receiving chamber adjacent the other end thereof to which the other end of said plunger is exposed, with said seal member, and said plunger being formed to permit fluid flow between said body member chamber and the tube end when the tube end engages said seal member, whereby said plunger is urged against said seal member, when fluid under pressure is received in said chamber, to increase the sealing action of the seal member with respect to the tube end, and including means for releasably locking the tube end in said body member when the tube end is inserted into said body member in sealing relation with said seal member, the improvement wherein:

said body member is formed in its side wall with at least one port opening at the exterior of said body member side wall and having communication with said chamber of said body member, wherein annular seal means are mounted about the exterior of said body member on either side of said port longitudinally of said body member, and including a sleeve member received over said body member and mounted for movement longitudinally of said body member, with said sleeve member being proportioned to extend between and be in sealing engagement with said both of seal means when disposed over said port, whereby said sleeve member may be moved longitudinally of said body member to selectively expose said port to the ambient atmosphere by disengagement from one of said seal means and to seal said port by making said sealing engagement with both of said seal means, whereby the body member chamber may be vented prior to releasing the tube end from said body member, and including an internal sleeve member mounted within said plunger member for sliding movement relative thereto and spring biased toward said body member one end, said seal member being in circumambient relation about the bore of said plunger and being proportioned to sealingly engage the external surface of the tube end when the latter is inserted into said body member through said one end thereof, and including:

abutment means cooperating between said internal sleeve member and said plunger for limiting movement of said internal sleeve member with respect to said plunger in the direction of said body member one end, said internal sleeve member being proportioned at its end adjacent said body member one end to extend within said seal member in sealing relation therewith when said abutment means cooperate.

whereby as the tube end is inserted into said body member through said one end thereof it sealingly engages said seal member and pushes said internal sleeve member longitudinally of said body member ahead of it and from within said seal member, and on removal of the tube end from said body member, said end of said internal sleeve member returns to said sealing engagement with said seal member, whereby when said device is not being used said internal sleeve member maintains said seal member expanded for reception over the tube end.

4. The improvement set forth in claim 3 wherein said abutment means comprises:

an annular seat formed in said plunger adjacent its said other end, with the other end of said internal sleeve member being outwardly flared in a configuration complementing the configuration of said seat.

5. The improvement set forth in claim 3 wherein:

the other end of said body member is formed with an opening in axial alignment with said plunger, said opening being formed for releasably securing said body member to a conduit member, and including an annular disc seated in said opening to serve as a spring seat for spring biasing said plunger and said internal sleeve member.

6. The improvement set forth in claim 3 including:

seal means interposed between said plunger and said body member in circumambient relation about said plunger whereby when fluid pressure is received in said chamber, the first mentioned end of said plunger is sealed off from said other end thereof to unbalance said plunger and cause same to be forced against said seal member to compress same against the tube end.

References Cited

UNITED STATES PATENTS

| | | | |
|---|---|---|---|
| 2,819,733 | 1/1958 | Maisch | 285—317 |
| 2,889,157 | 6/1959 | Kolbe | 137—583 |
| 3,062,240 | 11/1962 | Franck | 285—317 |
| 3,124,375 | 3/1964 | Maisch | 285—317 |
| 3,167,335 | 1/1965 | Maisch | 285—317 |

M. CARY NELSON, *Primary Examiner.*

W. R. CLINE, *Assistant Examiner.*